(12) United States Patent  
Yeh

(10) Patent No.: US 8,855,927 B2  
(45) Date of Patent: Oct. 7, 2014

(54) METHOD FOR A TWO-WAY RADIO SYSTEM TO MAKE AN ELECTRONIC MAP ENABLING EACH TWO-WAY RADIO TO INDEPENDENTLY PERFORM A FUNCTION OF GPS POSITIONING AND DISPLAY UNDER A CONDITION OF NO GPS ELECTRONIC MAP PROVIDED

(71) Applicant: Unication Group/Unication Co., Ltd., New Taipei (TW)

(72) Inventor: Shih-Tseng Yeh, New Taipei (TW)

(73) Assignee: UNICATION GROUP/Unication Co., Ltd., New Taipei (TW)

( * ) Notice: Subject to any disclaimer, the term of this patent is extended or adjusted under 35 U.S.C. 154(b) by 0 days.

(21) Appl. No.: 13/951,437

(22) Filed: Jul. 25, 2013

(65) Prior Publication Data

US 2013/0311087 A1   Nov. 21, 2013

Related U.S. Application Data

(63) Continuation-in-part of application No. 13/448,593, filed on Apr. 17, 2012, now abandoned.

(51) Int. Cl.  
G01C 21/00   (2006.01)  
G01C 21/20   (2006.01)  
G09B 29/10   (2006.01)

(52) U.S. Cl.  
CPC .......... *G01C 21/00* (2013.01); *G01C 21/20* (2013.01); *G09B 29/106* (2013.01)  
USPC .......................................................... 701/461

(58) Field of Classification Search  
CPC ........ H04W 4/023; G01C 21/00; G01C 21/05  
USPC .......................................................... 701/461  
See application file for complete search history.

(56) References Cited

U.S. PATENT DOCUMENTS

2009/0033552 A1* 2/2009 Kirmuss et al. .......... 342/357.08

\* cited by examiner

*Primary Examiner* — James Trammell  
*Assistant Examiner* — Michael D Lang  
(74) *Attorney, Agent, or Firm* — Cheng-Ju Chiang

(57) ABSTRACT

A group two-way radio system, in a condition of failing to obtain a GPS standard map, is capable of utilizing a console to control a computer to convert any paper map or electronic map not in compliance with a GPS standard to be an electronic map drawing file in compliance with the GPS standard. The map drawing file is transmitted through a RF repeater over an existing RF channel to one or multiple two-way radios in the group so as to enable the two-way radio to perform a method of group positioning and displaying based on the map drawing file.

7 Claims, 8 Drawing Sheets ethod for a two-way radio system to make an electronic map enabling each two-way radio to independently perform a function of GPS positioning and display under a condition of no GPS electronic map provided

CROSS-REFERENCE TO RELATED APPLICATION

This application is a continuation-in-part of U.S. patent application Ser. No. 13/448,593, filed Apr. 17, 2012, priority of the filing date of which is hereby claimed under 35 U.S.C. §120.

BACKGROUND OF THE INVENTION

1. Field of the Invention

The present invention relates to a method and system of making an electronic map for use in a global positioning system (GPS) radio communication device by utilizing a paper map under a condition of no GPS electronic map provided, and particularly to a group two-way radio system that, in a condition of failing to obtain a GPS map from a market, is capable of utilizing a computer by a console to convert and edit any non-GPS standard map to be an electronic map drawing file in compliance with a GPS standard where the electronic map drawing being made is then transmitted through a radio frequency (RF) repeater over an existing RF channel to two-way radios in the group for performing a function of positioning and displaying.

2. Related Art

A traditional two-way radio (or so called walkie-talkie, including an analog/digital radio system) for public safety or specialized people (e.g. policemen, fire fighters, security officers, medical teams, rescue teams) is generally not equipped with a Global Positioning System (GPS) or display function. Since the GPS has been widely used in portable electronic products (e.g. mobile phones, note book computers) or vehicles, certain traditional radios are improved to add the GPS function to provide location information or a historical track record to other people for a purpose of indicating a travelled path or a final location.

However, such a traditional radio equipped with a GPS system is often used to receive their own GPS positions to instantaneously identify a current position, which is capable of being concurrently transmitted to a group console or other members' communication devices. For the above-mentioned circumstances, users have to purchase or rent a map software and a application program from certain suppliers for which spending is just one thing to be concerned, and what is more, is the maps provided by the certain suppliers may not be suitable for a specialized group (such firefighters, emergency rescue team, policemen, or the military). For instance, a precise map of a coast, forest, high mountain and wild fields, or an interior plan of an airport, a market, school, office building and a military organization, is what traditional map suppliers cannot provide for users. As a result, when a rescue team is carrying out an emergent operation in a condition of failing to obtain a GPS standard map from the market for an emergency event site, communication devices used by the rescue team are not capable of launching the GPS system for figuring out topography and circulation of the event site, whereby causing problems of dispatch, command, or rescue from the group or even worse extensive damage or disaster.

In view of the drawbacks that traditional GPS system is not available to provide corresponding maps, the Applicant of the present invention thereby invents a method which enables a traditional group two-way radio system, in a condition of failing to obtain available GPS maps from the GPS system suppliers (or satellite navigation system), to utilize a computer to convert any paper map or electronic map to a map drawing file in compliance with a GPS standard relative to an emergent event site, and then transmit the map drawing file through an existing radio frequency (RF) communication system to one or multiple users in the group using a two-way radio undertaking an emergent operation for performing the function of positioning and displaying.

SUMMARY OF THE INVENTION

Accordingly, an object of the present invention is to provide a group two-way radio system that, in a condition of failing to obtain a GPS map from a market, is capable of utilizing a computer by a console to convert any paper map or electronic map not in compliance with a GPS standard to be an electronic map drawing file in compliance with the GPS standard which is to be stored in a map database and is then transmitted through a RF repeater over an existing RF channel to the two-way radios of the users in the group for performing a function of positioning and displaying.

Another object of the present invention is to provide a two-way radio capable of receiving and transmitting the map drawing file from the console in the group. The two-way radio at least is installed with a positioning and displaying program which is further intended to combine the map drawing file being retrieved with GPS location information of each two-way radio to be overlappingly displayed on an LCD screen of the two-way radio, wherein a current user of the event site is capable of being centrally displayed on the LCD screen.

In accordance with one aspect of the present invention, the positioning and displaying program at least comprises an instantaneously display option and a tracking display option. The instantaneously display option is intended to instantaneously display coordinate points that are converted from the received GPS location information of the two-way radio of the current user and the two-way radios of other users in the group on the electronic map of the LCD screen of the two-way radio. The tracking display option is intended to designate a tracking target from the list of the member data file displayed on the LCD screen, and the tracking target and all the coordinate points records stored in the two-way radio (historical trace) are concurrently displayed on the LCD screen in combination with the electronic map.

To achieve the above object, the present invention provides a method for making an electronic map for use in a global positioning system (GPS) radio communication device by utilizing a paper map under a condition of no GPS electronic map provided, comprising steps of: a. providing a console to control a computer to scan or download a non GPS standard map designated as a map template from a paper map, an aerial photograph, an engineering or a military map, the map template being temporarily stored in the computer; b. receiving GPS location information of at least two reference points of known locations through the computer and storing the GPS location information in the computer, the known locations of the at least two reference points being within a range of the map template; c. executing a map editing program built in the computer to overlappingly display the map template and coordinate points generated according to the GPS location information of the at least two reference points on a screen of the computer, controlling the computer to change a scale and angle of the map template in order to overlap the known locations of the at least two reference points on the map template with the coordinate points, and then editing the map template with the coordinate points to create one or multiple map drawing files as electronic maps in accordance with a GPS standard to be stored in a map database; d. actively or passively retrieving one or multiple of the map drawing files from the map database by the console, then transmitting the one or multiple map drawing files being retrieved through a radio frequency (RF) repeater to one or multiple two-way radios in a group over an existing RF channel, and storing the one or multiple map drawing files in a memory device of the one or multiple two-way radios; and e. obtaining one of the map drawing files as desired from the memory device of the two-way radio, and displaying the map drawing file being obtained on a liquid crystal display (LCD) screen of the two-way radio, and then executing a positioning and displaying program built in the two-way radio so as to perform a function of group positioning and displaying.

With the above mentioned method, the map drawing file relative to a jurisdictional area or any emergent event site is prepared and generated in advance by a dispatch center or mobile command repeater utilizing the computer. The map drawing is stored in the map database of the computer of a server and is capable of being transmitted to each two-way radio in the group or other group over an existing RF channel, so that the group two-way radio system is capable of making a map drawing file relative to a duty area (or event site) for being used to perform the function of positioning and displaying, in a condition of a GPS standard map is not available from suppliers.

DESCRIPTION OF THE PREFERRED EMBODIMENTS

For better and further knowledge and understanding of the device and efficacy of the present invention, embodiments are hereby given with detailed descriptions in cooperation with the attached drawings below.

Figure 1:
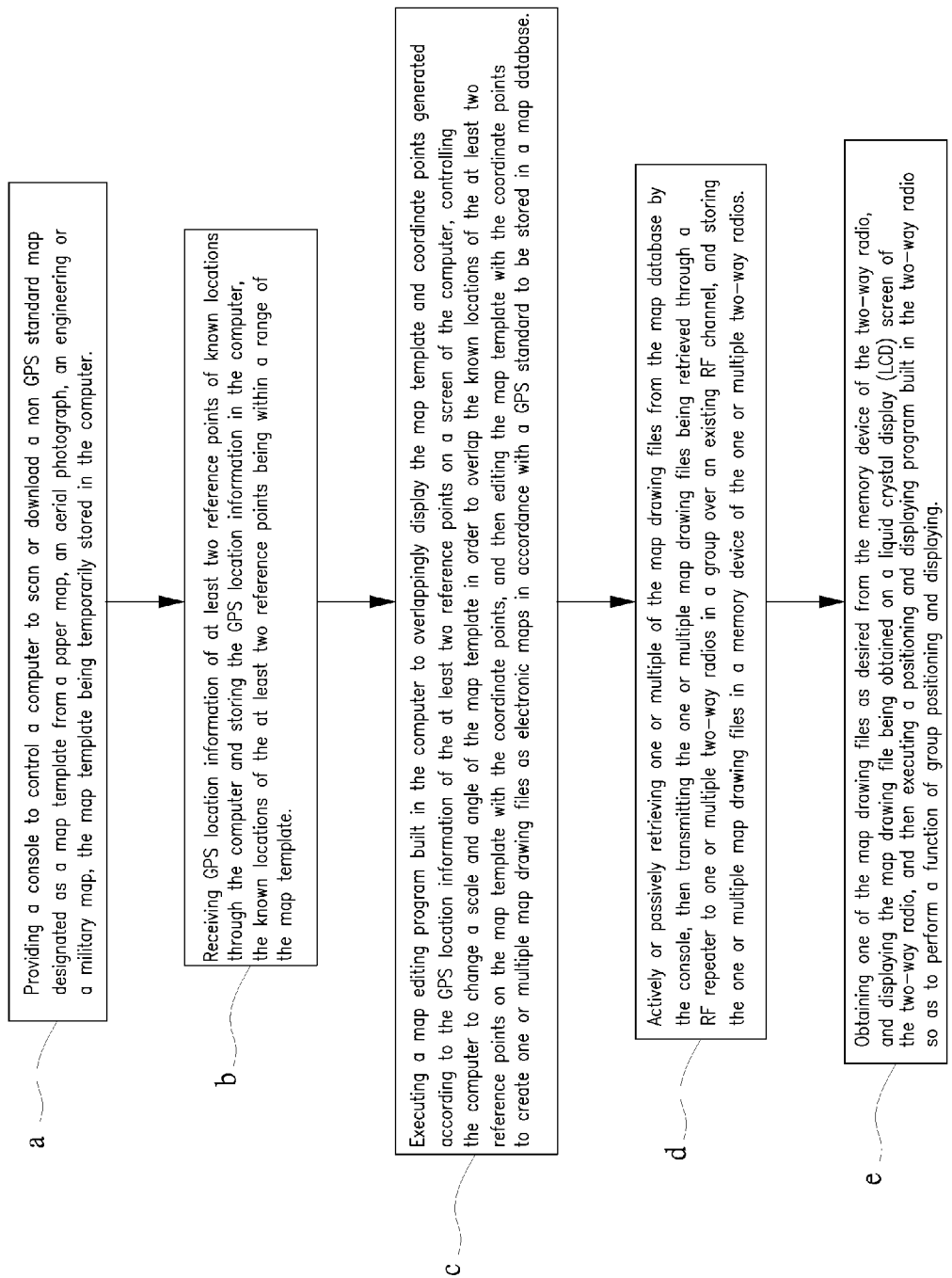
FIG. 1 is a flow chart of a method of making a positioning map by a console of the present invention.

Referring to FIG. 1, a method for making an electronic map for use in a global positioning system (GPS) radio communication device by utilizing a paper map under a condition of no GPS electronic map provided, comprises steps of:
a. providing a console to control a computer to scan or download a non GPS standard map designated as a map template from a paper map, an aerial photograph, an engineering or a military map, the map template being temporarily stored in the computer;
b. receiving GPS location information of at least two reference points of known locations through the computer and storing the GPS location information in the computer, the known locations of the at least two reference points being within a range of the map template;
c. executing a map editing program built in the computer to overlappingly display the map template and coordinate points generated according to the GPS location information of the at least two reference points (landmark) on a screen of the computer, controlling the computer to change a scale and angle of the map template in order to overlap the known locations of the at least two reference points on the map template with the coordinate points, and then editing the map template with the coordinate points to create one or multiple map drawing files as electronic maps in accordance with a GPS standard to be stored in a map database;
d. actively or passively retrieving one or multiple of the map drawing files from the map database by the console, then transmitting the one or multiple map drawing files being retrieved through a radio frequency (RF) repeater to one or multiple two-way radios in a group over an existing RF channel, and storing the one or multiple map drawing files in a memory device of the one or multiple two-way radios; and
e. obtaining one of the map drawing file as desired from the memory device of the two-way radio, and displaying the map drawing file being obtained on a liquid crystal display (LCD) screen of the two-way radio, and then executing a positioning and displaying program built in the two-way radio so as to perform a function of group positioning and displaying.

Figure 2:
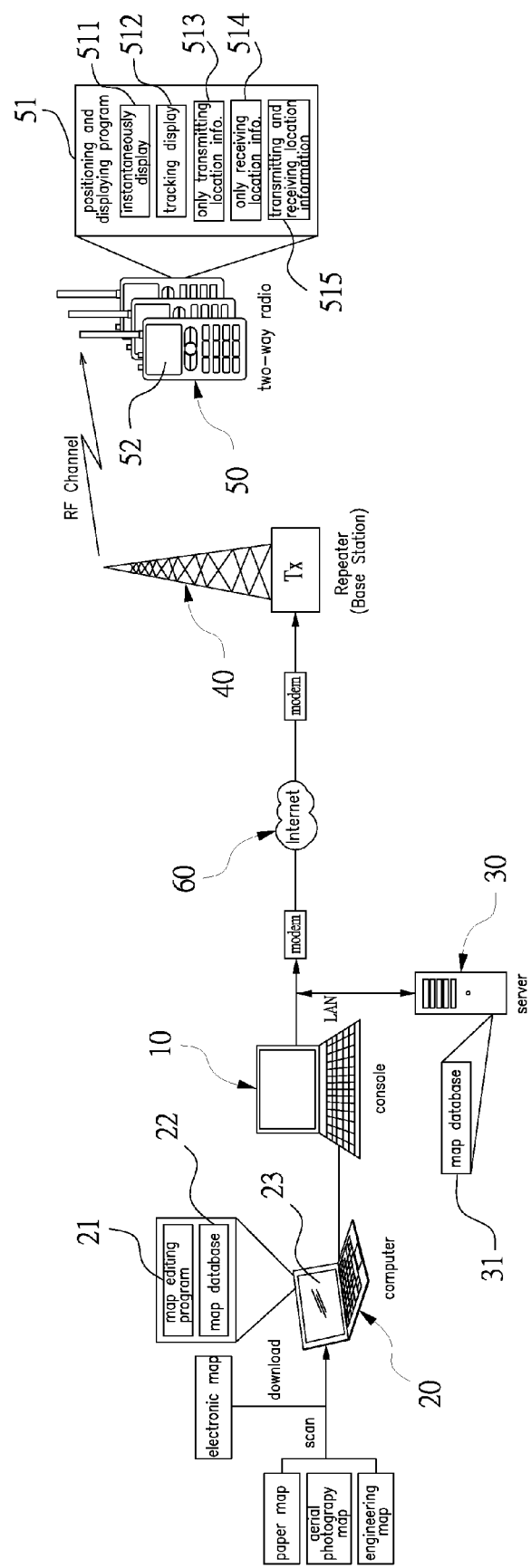
FIG. 2 is a schematic view showing a group two-way radio system of an embodiment of the present invention.

Further referring to FIG. 2 showing a group two-way radio system capable of making a GPS standard map for use in two-way radios in a group under a condition of no GPS standard map provided, the group two-way radio system comprises:
a stationary (or mobile) console 10 for contacting and controlling each of the two-way radios 50 in the group to carry out operations, the console 10 being electrically coupled with a computer 20 and/or a server 30; at least a radio frequency (RF) repeater 40 for transmitting messages as requested to the console 10 and the two-way radio 50 by the console over an existing RF channel; and multiple the two-way radios 50 for performing voice or/and data communication with each other or/and with the console over the existing RF channel in a direct conversation or re-transmitting mode, and each two-way radio 50 is capable of transmitting its own location information to one another, then the location information received is stored in a memory device of the two-way radio 50 (categorized into exclusive data files of a current user and other users in the group). The data files at least include one or all of names of the users in the group, codes, GPS location information, and transmission time.

The system as described above, wherein the computer 20 is installed with a map editing program 21 to be intended to edit and convert a paper map or a map in electronic format to a map drawing file in accordance with a GPS standard. The map drawing file is then stored in a database 22 and 31 of the computer 20 or the server 30 through the map editing program 21.

One or multiple of the map drawing files stored in the map database 22 and 31 are capable of being actively retrieved by the console 10 or passively retrieved based on a over-the-air programming (OTAP) command from the two-way radio 50, and then are being transmitted to the RF repeater 40 over Internet 60, wherein the RF repeater 40 further transmits the one or multiple of the map drawing files being received over the existing channel to one or multiple of the two-way radios 50 in the group.

The two-way radio 50 is installed with a positioning and displaying program 51 for combining one of the map drawing files with GPS location information of the two-way radio 50 of a current user or/and GPS location information of the two-way radios 50 of other users in the group and then the map drawing file with the GPS location information is displayed on the LCD screen 52 of the two-way radio 50 through the positioning and displaying program 51, so as to achieve functions of group positioning and displaying (e.g. position tracking, inquiry, recording, deleting).

Figure 3:
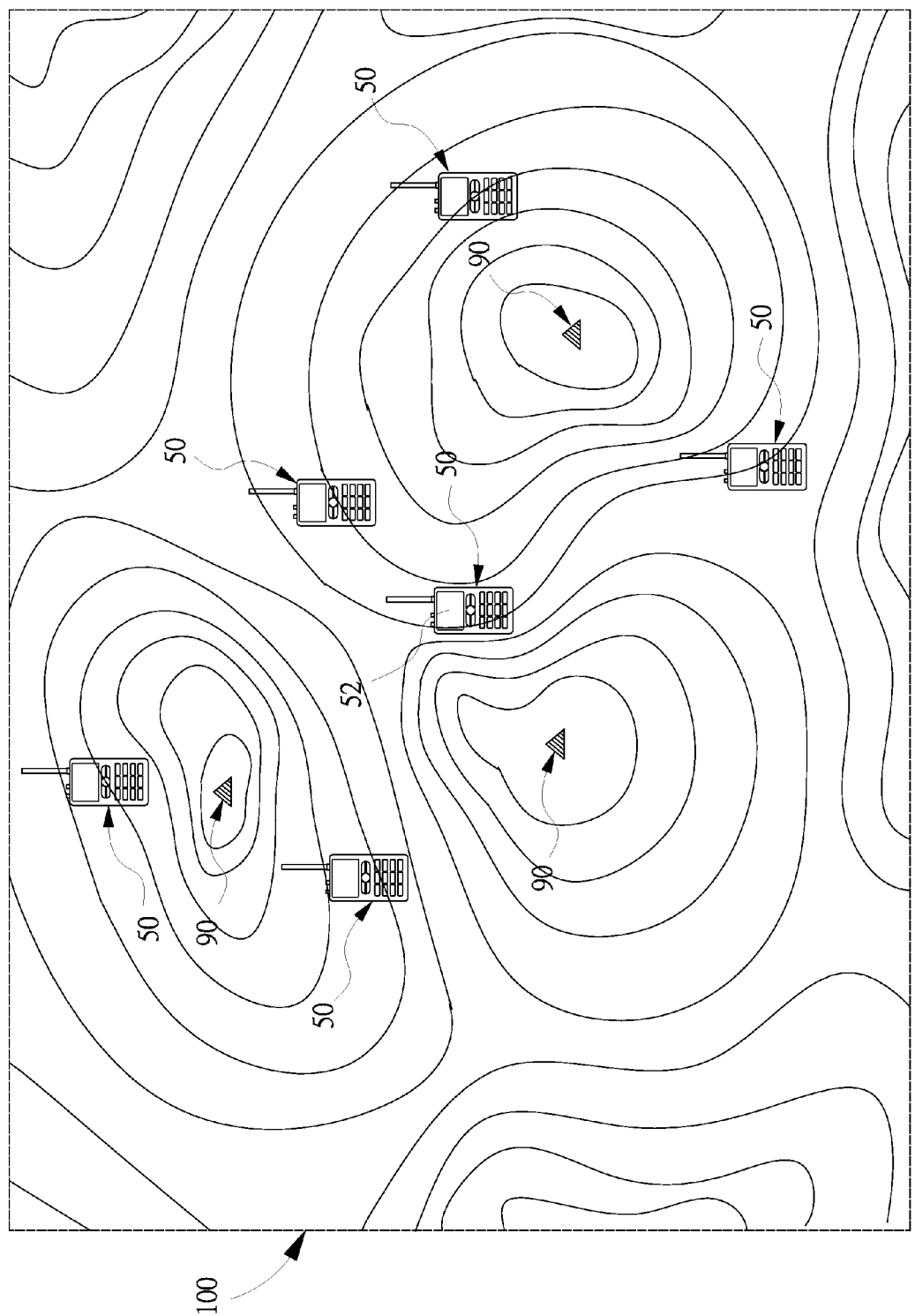
FIG. 3 is a schematic view showing a geographic area where several two-way radios and reference points of known location are spread thereon.
Figure 4:
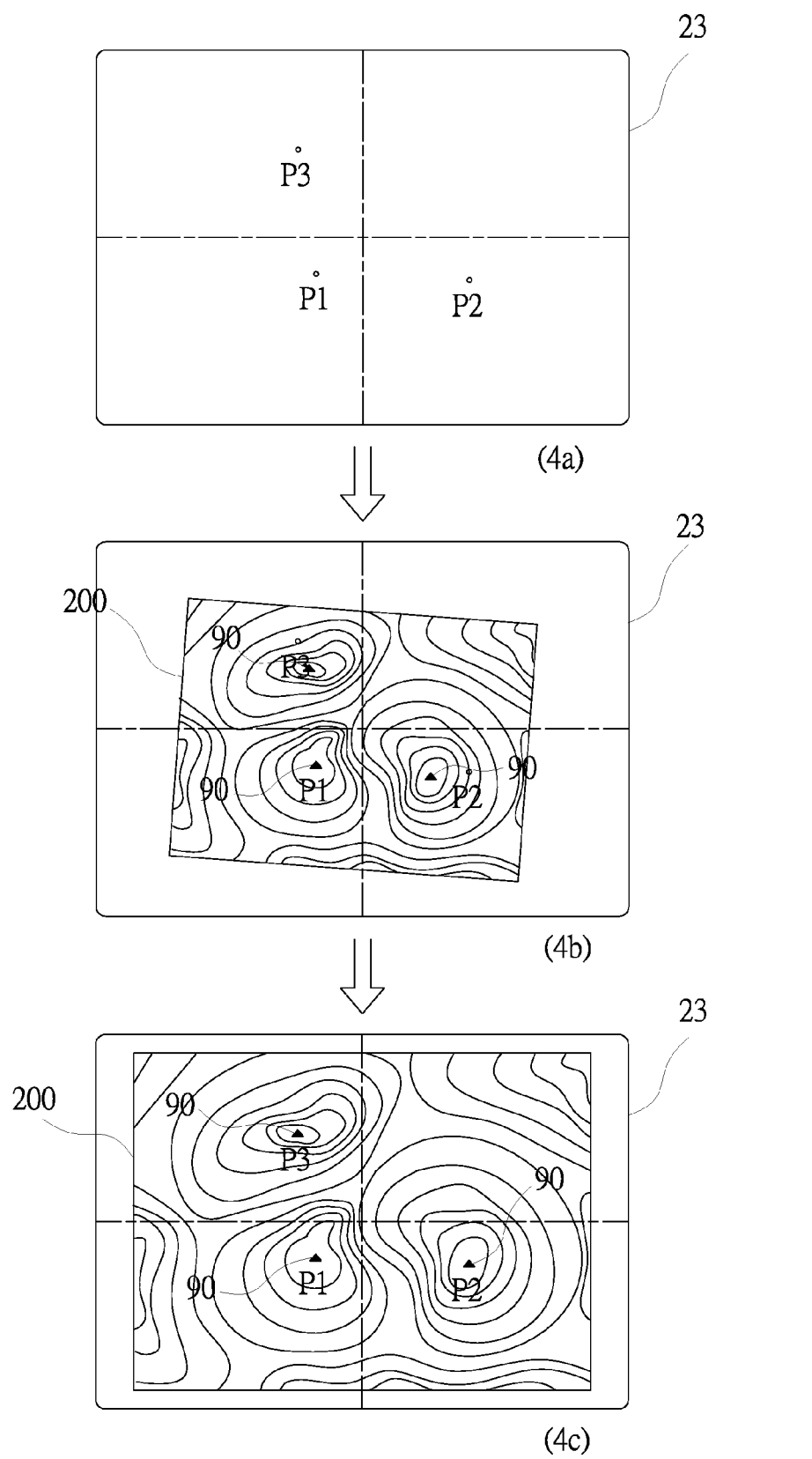
FIG. 4 is a schematic view showing a flow chart of making a map drawing file on a screen of a computer by the method of the present invention.

Further referring to FIGS. 3 and 4, FIG. 3 shows a spot topography 100 containing several predetermined reference points 90 of known locations and a plurality of users carrying the two-way radios 50.

Figure 5:
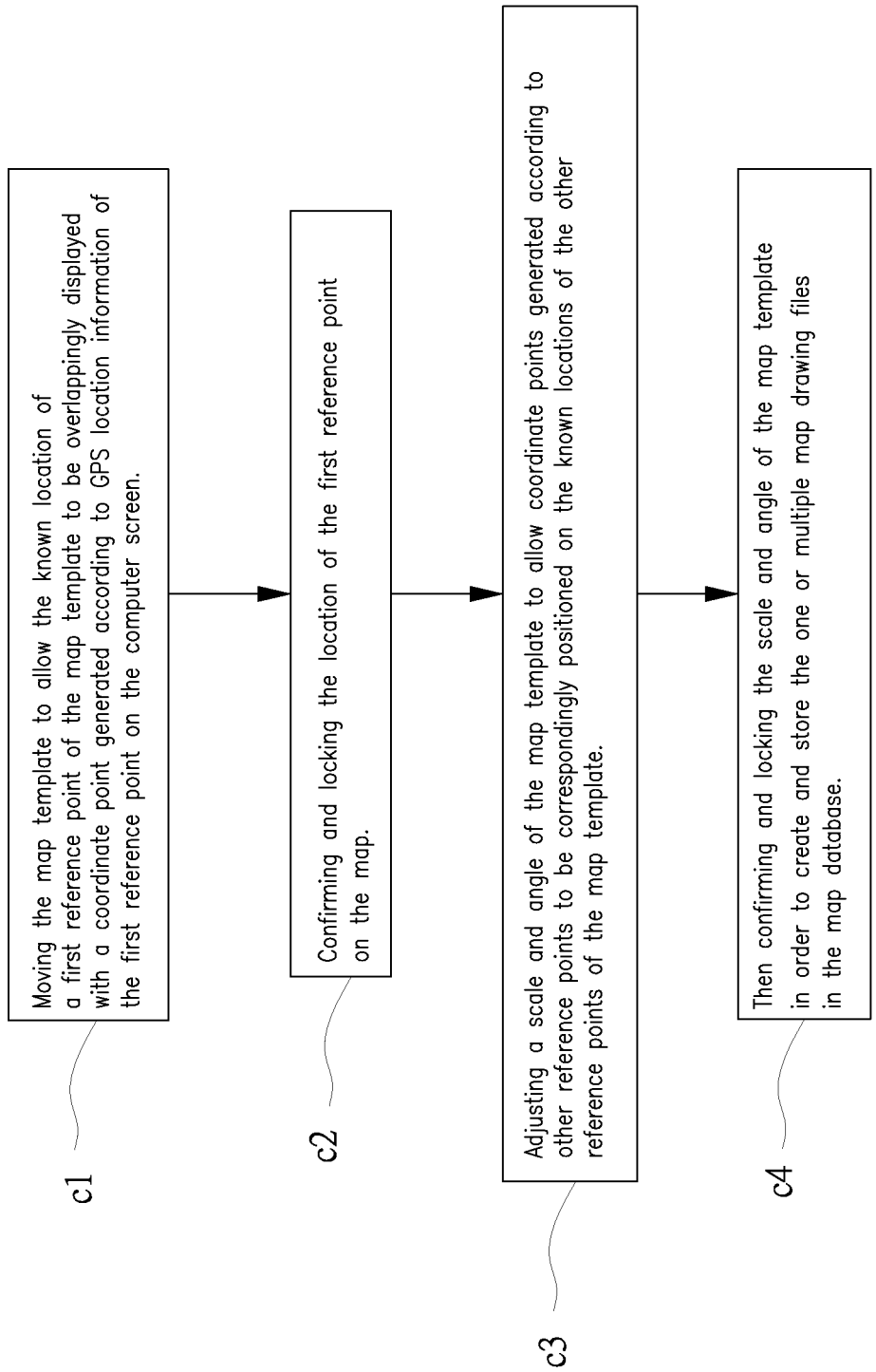
FIG. 5 is schematic view showing a flow chart of how a map template is controlled to overlap with each reference point by the method of the present invention.

When the computer 20 executes the map editing program as shown in FIG. 4, coordinate points (P1~P3, shown in (4b) of FIG. 4) generated according to GPS location information of at least two reference points 90 obtained in Step b (in this embodiment taking three reference points for instance) and the map template 200 obtained in Step a are overlappingly displayed on a screen 23 of the computer 20 (as shown in (4b) of FIG. 4); then proceed to the step of performing the map editing program 21 (as shown in FIG. 5) comprising: c1. moving the map template 200 on the screen 23 to allow the known location of a first reference point 90 of the map template 200 (selected from one of the at least two reference points) be overlappingly displayed with the coordinate point P1 generated according to GPS location information of the first reference point on the screen 23 (as shown in (4b) of FIG. 4); c2. confirming and locking the location of the first reference point P1 on the map template 200; c3. adjusting a scale and angle of the map template 200, with the first reference point P1 as a center of scaling or rotating, to allow the coordinate points P2 and P3 generated according to other reference points 90 to be correspondingly positioned on the known locations of the other reference points 90 of the map template 200 (as shown in (4c) of FIG. 4). In this manner, the scale and angle of the map template 200 exactly match the GPS location information; c4. next confirming and locking the scale and angle of the map template 200 in order to create and store the one or multiple map drawing files to correspond to the spot topography 100, and the one or multiple map drawing files are stored in the database 22 and 31 of the computer 20 or the server 30. Accordingly, the map drawing files stored in the database 22 and 31 are created in accordance with the GPS standard and can be used in cooperation with the GPS location information being received in either of the two-way radios 50.

Figure 6:
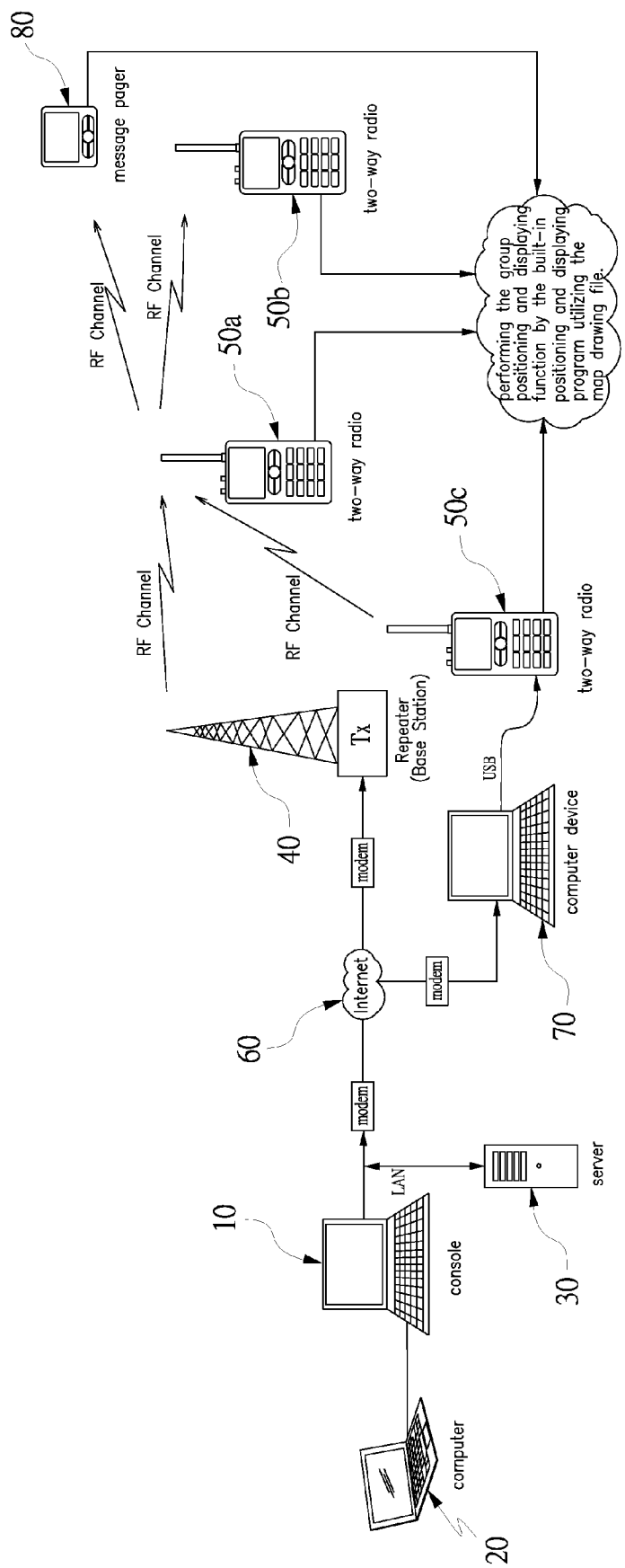
FIG. 6 is a schematic view showing a group two-way radio system of another embodiment of the present invention.

Furthermore, based on a request actively requested by the console 10 or a OTAP command from users in the group, the map drawing files stored in the database 22 and 31 are capable of being transmitted through the RF repeater 40 over an existing RF channel to the two-way radios 50 in the group for standby use (as shown in FIG. 2). As shown in FIG. 6, the map drawing files stored in the database are capable of being transmitted to the other two-way radio 50c in the group by another computer device 70 through Internet 60 over a universal serial bus (USB) cable as cable transmission; then the two-way radio 50c transmits the map drawing file over an existing RF channel in a direct call mode or repeater mode to the other two-way radios 50a and 50b in the group or RF communication devices 80 (e.g. message pagers) of other group.

As shown in FIGS. 2 and 6, each of the two-way radios 50, 50a, 50b, 50c, 80 is installed with a positioning and displaying program 51 for decoding the map drawing file being received and for performing positioning and displaying. The positioning and displaying program 51 at least comprises an instantaneously display option 511 and a tracking display option 512.

The instantaneously display option 511 is intended to instantaneously display all the coordinate points M0~M5 that are converted from the received GPS location information of the two-way radio of the current user and the two-way radios of other users in the group on the electronic map of the LCD screen of the two-way radio. The instantaneously display option 511 is further intended to define a center location by designating the coordinate points of the current user or one of the other users in the group from a list of a member data file displayed on the LCD screen 52, or the center location capable of being defined by designating GPS location information about an event site provided in a dispatch message sent from the console or in a message from other users in the group, whereby the electronic map is displayed on the LCD screen 52 with the center location being positioned at a center of the LCD screen 52.

Figure 7:
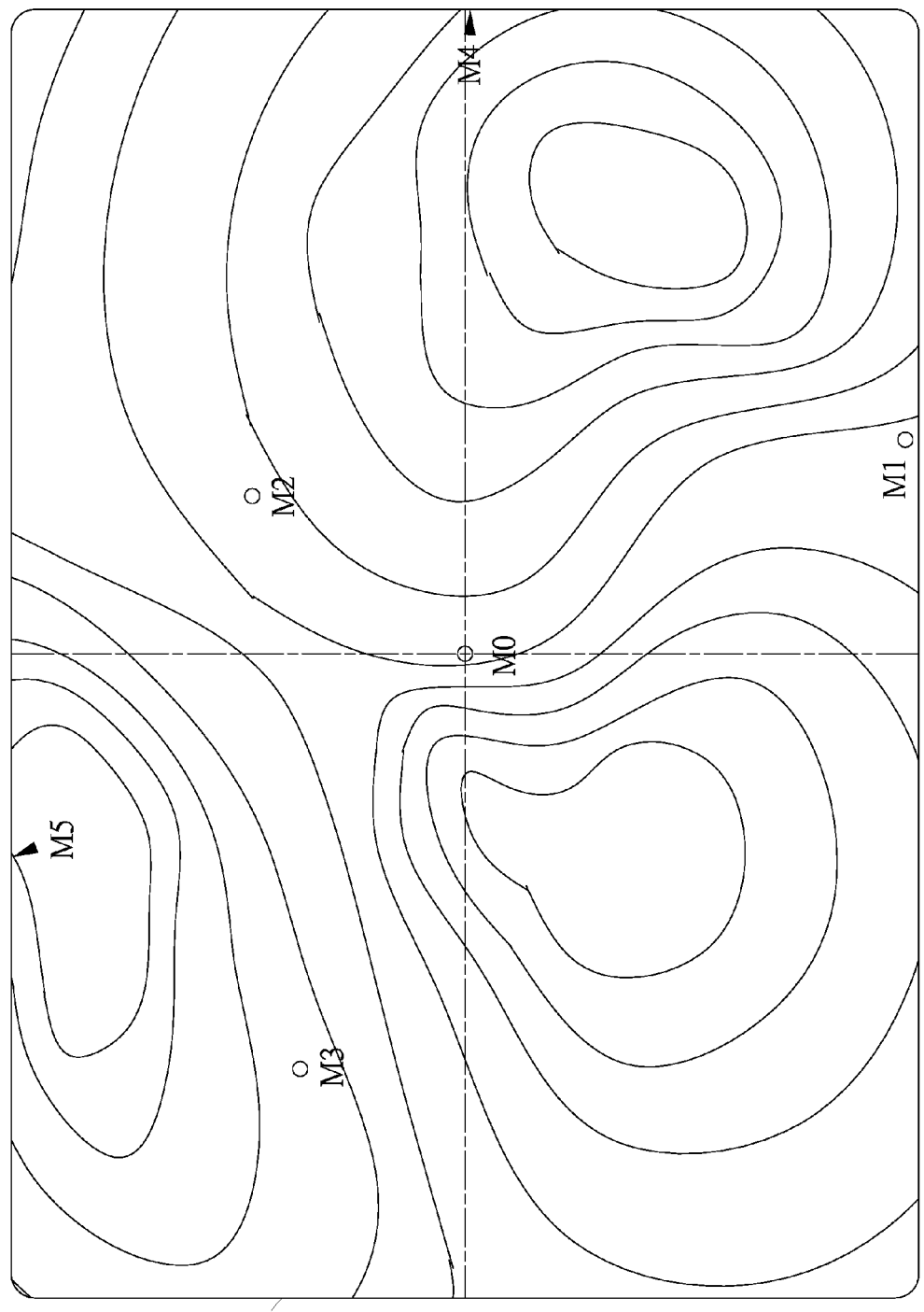
FIG. 7 is a schematic view showing the reference points of FIG. 3 being positioned and displayed through the two-way radio.

As an embodiment shown in FIG. 7 with the center location M0 standing for the current user, the electronic map is capable of being zoomed relative to the center location. The coordinate points M1~M3 of several users are synchronously displayed on the electronic map on the LCD screen 52 (i.e., corresponding to the area in FIG. 3). Furthermore, one or multiple arrows are synchronously displayed around edges of the LCD screen 52 where directions pointed by the arrows indicate where the other users M4~M5 are positioned outside and near the electronic map. As a result, each two-way radio 50 user can see both his/her own position and the other users positions at the same time on the LCD screen 52.

The tracking display option 512 is intended to designate the current user or any other users in the group as a tracking target or an enquiry target from the list of the member data file displayed on the LCD screen 52 and then incorporate the tracking target or the enquiry target into all the coordinate points (historical trace) of the two-way radio 50 so that it can be displayed on the LCD screen in combination with the electronic map.

The two-way radio 50 is further capable of receiving OTAP commands from the console 10 or the other two-way radios 50 in the group in order to be forced to execute the positioning and displaying program 51. Moreover, the positioning and displaying program 51 comprises one of or all of three subprograms including a location information transmitting subprogram 513, a location information receiving subprogram 514, and a location information transceiver subprogram 515. Location information being received is instantaneously displayed by the positioning and displaying program 51.

The location information transmitting subprogram 513 is intended to only transmit GPS location information about the current user to the two-way radio (including a dispatch center or other devices) filing a request so as to enable the two-way radio filing a request to perform a function of recording, inquiring, or deleting historical tracks of users or a function of temporarily tracking; and the subprogram 513 is further intended to economize electricity consumption and extend a time of mayday when calling other two-way radios for help in case of emergency.

The location information receiving subprogram 514 is intended to only receive GPS location information about a two-way radio transmitting a mayday signal in the group so as to increase a tracking and rescuing time for receiving and searching a location of the two-way radio calling for help.

The location information transceiver subprogram 515 is intended to accept invitation from other users or/and to invite other users in the group to take part in another group already executing the positioning and displaying program, whereby location information about the users in the group is capable of being transmitted between each other so as to realize the function of positioning and displaying.

The method and system as described above, once the positioning and displaying program 51 of the two-way radio 50 is being executed, a time interval of launching GPS location information of the current user is set by the user or/and by the program. The time interval is subject to change depending on a moving speed of the two-way radio, wherein the faster the moving speed is, the shorter the time interval is, and the positioning and displaying program 51 is not closed automatically or manually until a running time set by the program is fulfilled or/and a notification to end the program is received.

Figure 8:
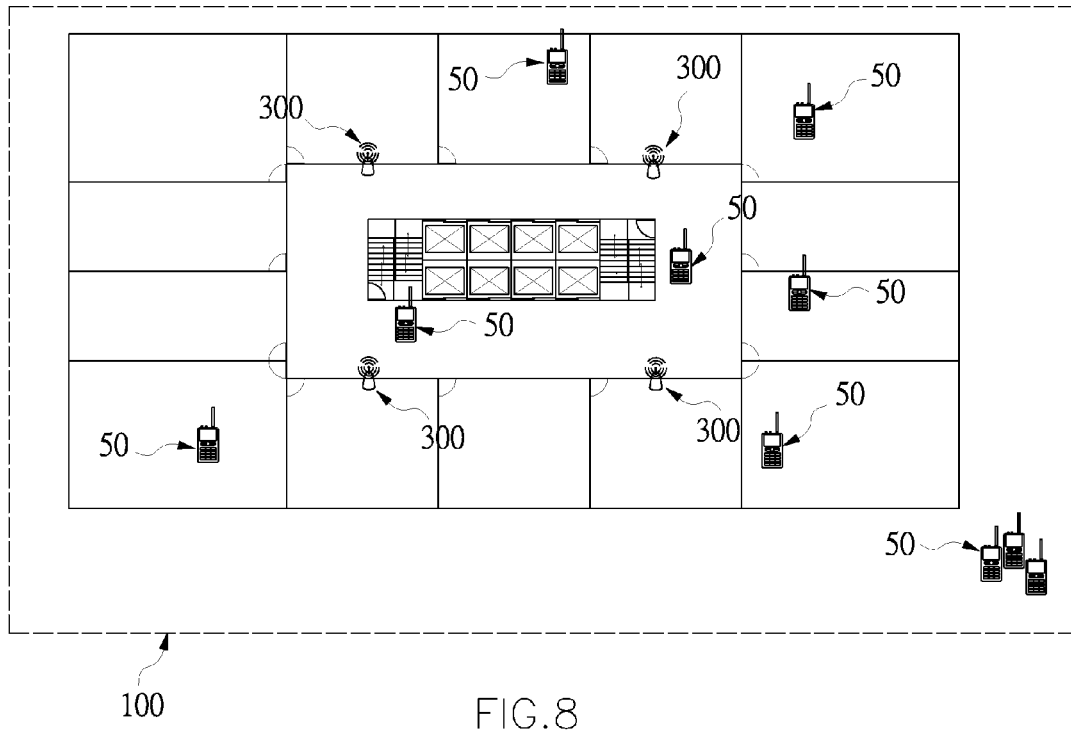
FIG. 8 is a schematic view showing the two-way radios and multiple location sensors are shown in a plan view of a building.

Further referring to FIG. 8 of the method for self-making a map as described above, FIG. 8 illustrates a plan view of a building 100 where four location sensors 300 and nine two-way radios 50 are spread thereon. In this embodiment, GPS signals are not available to be received in the building, or a regional area is too small to allow the user to utilize GPS location information to clearly identify a position of each user in the group. The method of the present invention is further to be automatically or manually switched from a GPS receiving module to a short range communication module (e.g. WI-FI, Bluetooth, Zigbee, radio frequency identification (RFID), Tag and other similar techniques) to receive more than at least two location sensors, such as beacons, WAPs, RF tags, for identifying locations of the location sensors 300 are known in the building, so as to calculate the coordinate points P1~P4 of each location sensor 300 by triangulation according to received signal strength indication (RSSI), then temporarily storing data being calculated in the computer, whereby the location sensors 300 function as reference points for making electronic maps alone.

Further following the method of making an electronic map as disclosed in FIG. 1, confirm a location of a coordinate point of the first location sensor (first reference point), then zooming the map template and adjusting its angle to enable the coordinate point of each location sensor to be correspondingly positioned on the map template, and finally, confirm and lock the scale of the map template so as to create at least a map drawing file as an electronic map to be stored in the map database, wherein the location sensors 300 are capable of being utilized in combination with GPS location of adjacent one or more reference points.

Figure 9:
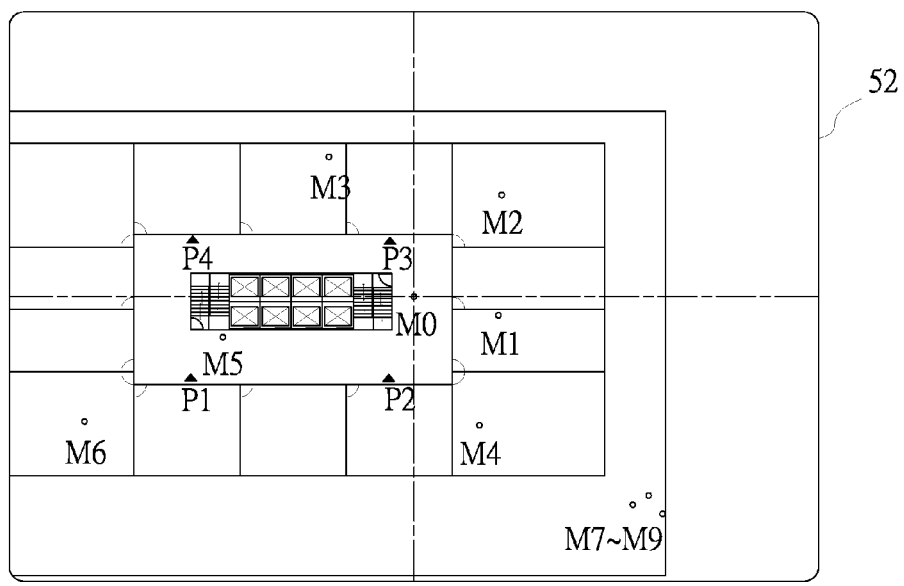
FIG. 9 is a schematic view showing the two-way radios and the location sensors being positioned and displayed through the two-way radio.

Accordingly, the map data drawing files stored in the database are allowed to be used in the group two-way radio system and to be transmitted to the two-way radio of each user in the group (or the console) for use. In use (as shown in FIG. 9), the coordinate points M0~M9 are capable of being detected and calculated by the short range communication module and displayed on the LCD screen 52 so as to achieve the object of positioning and displaying.

It is understood that the invention may be embodied in other forms within the scope of the claims. Thus the present examples and embodiments are to be considered in all respects as illustrative, and not restrictive, of the invention defined by the claims

What is claimed is:

1. A method for a two-way radio system to make an electronic map enabling each two-way radio to independently perform a function of Global Positioning System (GPS) positioning and display under a condition of no GPS electronic map provided, comprising steps of:
   a. providing a console to control a computer to scan or download a non GPS standard map designated as a map template from a paper map, an aerial photograph, an engineering or a military map, the map template being temporarily stored in the computer;
   b. receiving GPS location information of at least two reference points of known locations through the computer and storing the GPS location information in the computer, the known locations of the at least two reference points being within a range of the map template;
   c. executing a map editing program built in the computer to overlappingly display the map template and coordinate points generated according to the GPS location information of the at least two reference points on a screen of the computer, controlling the computer to change a scale and angle of the map template in order to overlap the known locations of the at least two reference points on the map template with the coordinate points, and then editing the map template with the coordinate points to create one or multiple map drawing files as electronic maps in accordance with a GPS standard to be stored in a map database;
   d. actively or passively retrieving one or multiple of the map drawing files from the map database by the console, then transmitting the one or multiple map drawing files being retrieved through a radio frequency (RF) repeater to one or multiple two-way radios in a group over an existing RF channel, and storing the one or multiple map drawing files in a memory device of the one or multiple two-way radios; and
   e. obtaining one of the map drawing files as desired from the memory device of the two-way radio, and displaying the map drawing file being obtained on a liquid crystal display (LCD) screen of the two-way radio, and then executing a positioning and displaying program built in the two-way radio, enabling each of the two-way radio to independently perform a function of group positioning and displaying, wherein the function of group positioning and displaying includes position tracking, inquiry, recording and deleting;
   wherein the step of executing the map editing program built in the computer further comprises:
   c1. moving the map template to allow the known location of a first reference point of the map template to be overlappingly displayed with a coordinate point generated according to GPS location information of the first reference point on the computer screen;
   c2. confirming and locking the location of the first reference point on the map;
   c3. adjusting a scale and angle of the map template to allow coordinate points generated according to other reference points to be correspondingly positioned on the known locations of the other reference points of the map template; and c4. confirming and locking the scale and angle of the map template in order to create and store the one or multiple map drawing files in the map database.

2. The method of claim 1, wherein one or multiple of the map drawing files stored in the map database are capable of being actively retrieved by the console or passively retrieved based on a over-the-air programming (OTAP) command from the two-way radio, and then are being transmitted to the RF repeater via Internet, wherein the RF repeater further transmits the one or multiple of the map drawing files being received via the existing RF channel to one or multiple of the two-way radios in a group.

3. A method for a two-way radio system to make an electronic map enabling each two-way radio to independently perform a function of Global Positioning System (GPS) positioning and display under a condition of no GPS electronic map provided, comprising making at least a console and multiple two-way radios perform voice or/and data communication via an existing radio frequency (RF) channel, each of the two-way radios equipped with a memory device and a liquid crystal display (LCD) screen;

wherein the console is electrically coupled with a computer or/and a server, the computer installed with a map editing program for editing and converting a paper map or a map in electronic format to a map drawing file as an electronic map in accordance with a GPS standard which is to be stored in a database of the computer or the server;

one or multiple of the map drawing files stored in the map database capable of being actively retrieved by the console or passively retrieved based on a command from the two-way radio and then being transmitted via the existing RF channel to the two-way radios in the group, and are stored in the memory devices of the two-way radios; and each of the two-way radios installed with a positioning and displaying program for combining one of the map drawing files with GPS location information of a current user or/and other users in the group, and for displaying the map drawing file with the GPS location information on the LCD screen of the two-way radio.

4. The method of claim 3, wherein the positioning and displaying program at least comprises an instantaneously display option and a tracking display option;

the instantaneously display option being intended to instantaneously display all coordinate points that are converted from the received GPS location information of the current user and the other users in the group on the electronic map of the LCD screen of the two-way radio, and being intended to designate one coordinate points of the current user or the other users in the group as a center location from a list of a member data file displayed on the LCD screen, whereby the electronic map is displayed on the LCD screen with the designated location positioned at a center of the LCD screen; and the tracking display option being intended to designate the current user or any other users in the group from the list of the member data file displayed on the LCD screen as a tracking target or an enquiry target, and then to display all coordinate points of the designated target stored in the two-way radio on the LCD screen in combination with the electronic map.

5. The method of claim 3, wherein the positioning and displaying program is further intended to indicate where other users outside of the electronic map are as directions pointed by arrows displayed around the LCD screen.

6. The method of claim 3, wherein a time interval of location information transmitted by the two-way radio is subject to change depending on a moving speed of the two-way radio.

7. The method of claim 3, wherein the two-way radio is capable of retransmitting the map drawing file received from the console to other two-way radios in the group via the existing RF channel.

* * * * *